(12) United States Patent
Anne et al.

(10) Patent No.: US 6,744,812 B2
(45) Date of Patent: Jun. 1, 2004

(54) DUAL MODE PHONE LINE NETWORKING MODEM UTILIZING CONVENTIONAL TELEPHONE WIRING

(75) Inventors: Ramakrishna Anne, Spring, TX (US); Robert F. Watts, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/314,091

(22) Filed: Dec. 6, 2002

(65) Prior Publication Data

US 2003/0081741 A1 May 1, 2003

Related U.S. Application Data

(63) Continuation of application No. 09/359,018, filed on Jul. 22, 1999.

(51) Int. Cl.[7] .................................................. H04B 1/38
(52) U.S. Cl. ....................................................... 375/222
(58) Field of Search ................................. 375/222, 223, 375/224; 379/93.01, 27

(56) References Cited

U.S. PATENT DOCUMENTS

| | | | | |
|---|---|---|---|---|
| 6,049,595 A | * | 4/2000 | Mizuta et al. | 379/93.05 |
| 6,122,216 A | * | 9/2000 | Dykes | 365/230.03 |
| 6,247,102 B1 | * | 6/2001 | Chin et al. | 711/150 |
| 6,370,156 B2 | * | 4/2002 | Spruyt et al. | 370/480 |
| 6,407,987 B1 | * | 6/2002 | Abraham | 370/295 |

* cited by examiner

Primary Examiner—Khai Tran

(57) ABSTRACT

A networking modem capable of full duplex communication over a telephone line is adapted for use as a component of a computer system. The modem comprises a digital signal processor (DSP) capable of implementing a plurality of digital modulation and demodulation techniques, including pulse position modulation (PPM), quadrature phase shift keying (QPSK), and quadrature amplitude modulation (QAM). The DSP implements a digital phase locked loop (DPLL), including a carrier NCO and a carrier detector to synchronize local demodulation timing to an incoming carrier signal. Available processing options include spectral agility for optimizing channel capacity, symbol shaping to compensate for evolving channel conditions, and echo cancellation. The digital processing provides a flexible, adaptive, programmable, and backward compatible solution to eliminate various problems with prior art systems, including timing inaccuracies, incompatibility with standard modulation techniques, the half duplex limitation, and the susceptibility to noise that increases intersymbol interference and limits throughput.

32 Claims, 5 Drawing Sheets

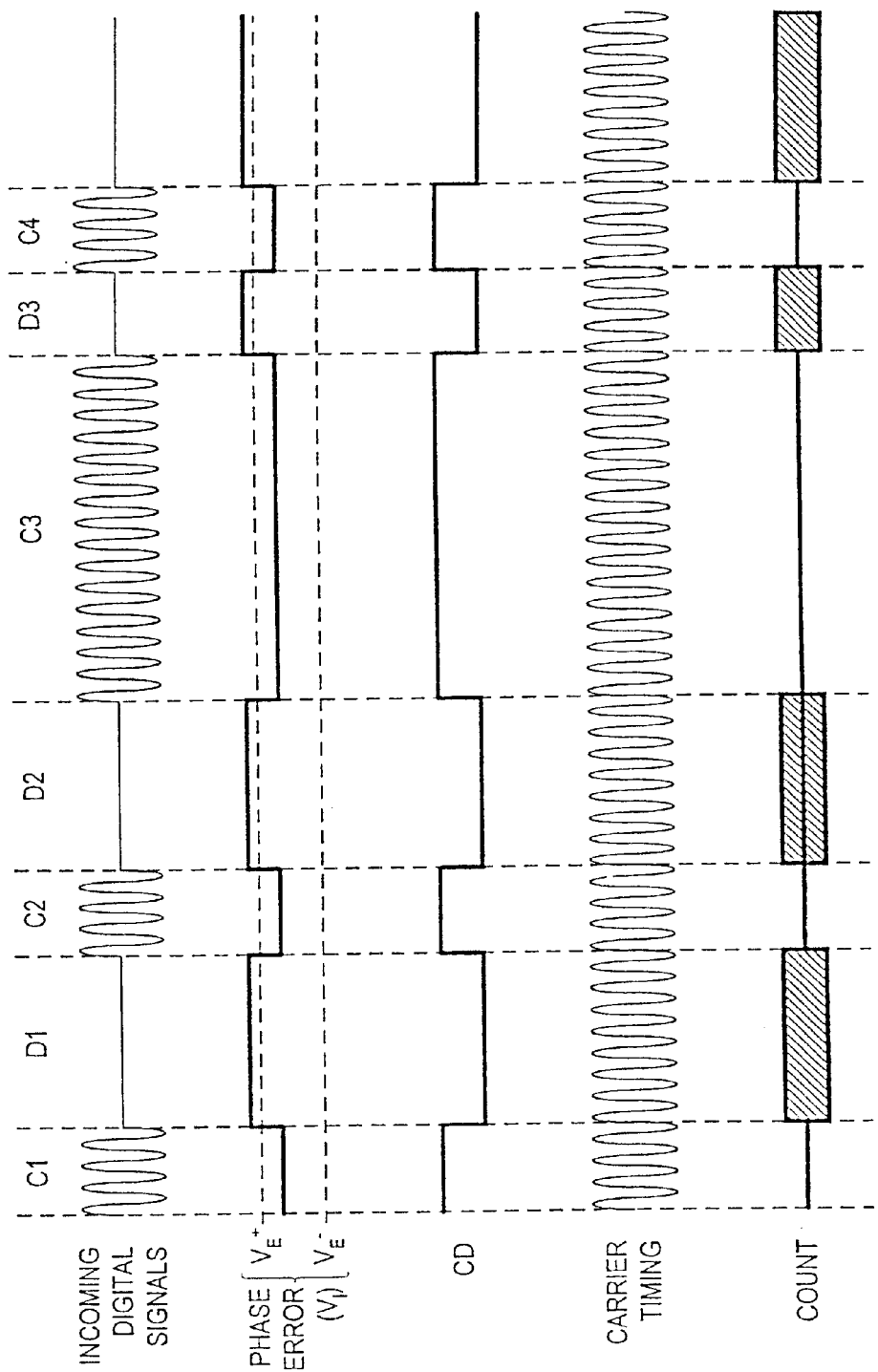

DUAL MODE PHONE LINE NETWORKING MODEM UTILIZING CONVENTIONAL TELEPHONE WIRING

CROSS-REFERENCE TO RELATED APPLICATIONS

This application is a continuation of U.S. patent application Ser. No. 09/359,018, filed Jul. 22, 1999 and is incorporated by reference herein.

STATEMENT REGARDING FEDERALLY SPONSORED RESEARCH OR DEVELOPMENT

Not applicable.

FIELD OF THE INVENTION

The present invention relates generally to computer systems and particularly to networking computer systems. More particularly, the present invention relates to implementing a computer network using conventional telephone wiring.

BACKGROUND OF THE INVENTION

Computer networks permit multiple computer systems to communicate and share data over one or more transmission lines. Although a network may connect computers located anywhere in the world, a smaller local area network (LAN) is commonly used to connect computers located in fairly close proximity, such as within the same room or building. A LAN typically comprises one or more physical wires or cables that connect the computers, although wireless networks are available. In a multidrop LAN, all of the networked computers connect to the same physical cable (or wireless link), either directly or through an intermediate device such as a terminator or adapter. Local area networks have enjoyed widespread popularity in the workplace, where they permit users to share documents and send and receive electronic messages. Local area networks also permit each personal computer to connect with one or more "fileserver" computers, which generally provide a central storage location for documents and program files and which often form gateways to other networks, such as the Internet.

Until recently, computer networks in the home have not been widely implemented due to the high cost of purchasing the computers and because of the expense, trouble, and difficulty faced by the average consumer of installing network cables and running the equipment. As computers have become cheaper and more powerful, however, many consumers have purchased multiple computers for the home; and recent developments in computer networking have made it easier to form multidrop home networks by connecting computers through existing home telephone lines. The networked computers then send data to each other over the phone wires. Similar networks rely on standard telephone wiring in businesses, schools, apartments, dormitories, hotels, and other structures which have the wiring in place.

Even though these network devices communicate over telephone lines, they are not required to wait for a dial tone before establishing communication or to follow other standard protocols required for outgoing calls. As a result, the home networking devices can communicate over a phone line that is in use by another service, such as "plain old phone service" (POTS) or Digital Subscriber Line (DSL) service. In order to coexist with other services, the phone line network signals are transmitted at high frequencies which a telephone, POTS modem, or DSL modem does not use. The high frequencies used for phone line networking typically range from approximately 2 million hertz (MHz) to 10 MHz, in contrast with POTS, which occupies the frequency spectrum from 0 hertz to about 4 thousand hertz (kHz). The POTS frequency band is within the audio frequency band, which includes frequencies that the human ear can detect. Digital Subscriber Line (DSL) modems generally communicate in the range of around 100 kHz to approximately 1.5 MHz.

Computers on a phone line network system generally send digital data by (1) transmitting a high frequency "carrier" signal and (2) altering, or modulating, the carrier signal based on the data. The number of possible alterations typically is fixed (hence the "digital" nature of the data), and each type of alteration represents a particular data value. The computer that is receiving the data monitors the carrier signal and determines the data that was transmitted by detecting, or "demodulating," the alterations. Current phone line networking equipment uses pulse position modulation, in which the carrier is a short pulse that is transmitted periodically at fixed time intervals. To transmit a particular data value, the transmitting computer alters the timing between two successive pulses by delaying the second pulse relative to the first pulse. Accordingly, the pulses represent the carrier signal, and the delays represent the modulation. By determining the time delay between pulses, the receiving computer can detect which data value was transmitted.

Unfortunately, pulse position modulation tends to be particularly susceptible to electronic interference (called "noise") picked up by the phone lines. The delay values can be adaptively lengthened to combat the noise, but doing so generally lowers the data throughput, or the speed at which data is transmitted. Although the voltage threshold level can be raised above the noise level, doing so requires the transmitting computer to transmit at higher voltage levels, requiring more expensive signal filtering circuitry and increasing power consumption.

In addition, the analog circuitry currently used to measure the time delays in pulse position modulation signals is not highly sensitive to small time increments. As a result, with conventional circuitry the different delay values available to a single pulse must be spaced somewhat far apart in time, limiting the achievable data rate to no higher than about one million bits (or "megabits") per second, a relatively slow throughput compared to that of conventional LAN's. The analog circuitry also is susceptible to normal manufacturing tolerances in the crystals which control timing in the transmitter and receiver. The crystal in the transmitter controls the intervals between carrier pulses, while the crystal in the receiver controls the circuitry that measures the intervals to decode the data. If the transmitter crystal frequency deviates significantly from the receiver crystal frequency, however, then the receiver may not decode the data properly.

Another problem with pulse position modulation is that, unlike other types of digital modulation techniques, standardized software code is not widely available for implementing pulse position modulation algorithms. As a result, "time-to-market" can be slow for products that incorporate pulse position modulation. For these and other reasons, pulse position modulation is rarely used as a standard modulation technique in industry and thus suffers from lack of compatibility with many existing systems, dramatically increasing the time and effort required to design and implement a network.

An added difficulty with pulse position modulation is the "bursty" nature of the modulated carrier, which means that the maximum voltage of the signal is significantly higher than the average signal voltage. The signal burstiness is related to the fact that the signal reaches its highest level whenever a pulse is transmitted but remains at a zero level during the delays between pulses. Bursty signals place high performance demands on filtering circuitry, requiring greater expense and complexity in the receiver. Unless costly precautions are taken, bursty signals can interfere with normal telephone conversations.

Existing phone line networking systems also suffer from relying on analog comparator circuitry to detect when the transmitted signals exceed the voltage threshold. Although analog circuitry can be cheaper and simpler to implement that digital circuitry in some cases, analog comparators are sensitive to noise, a condition that ultimately can limit the data throughput. The analog circuitry also tends to be relatively difficult and expensive to upgrade as technology progresses. For example, existing analog hardware typically cannot be modified to support standard modulation techniques or higher data rates. The analog circuitry also prevents full duplex communication, which allows computers to transmit and receive at the same time over the network. Instead, current systems operate in half duplex mode, which means that a single computer cannot transmit and receive data at the same time.

Further, the analog nature of existing phone line network equipment makes compensating for unpredictable conditions in phone line quality difficult. Certain telephone cables, for example, may affect certain signal frequencies (or "frequency bands") differently. Within certain guidelines, communications devices generally are allowed to select an optimum frequency band before transmitting data. The analog nature of existing phone line network equipment, however, makes it difficult to adjust or control the frequency band. Instead, existing analog equipment must be designed to operate within a fixed frequency spectrum, resulting in degraded performance if the cable operates poorly within the chosen frequency band.

For the foregoing reasons, a telephone line networking system capable of resolving these problems would greatly improve the speed, cost, and complexity of implementing computer networks. Such a system, if devised, should incorporate spectral flexibility, robust noise performance, high data rates, standard modulation techniques, and full duplex communication without requiring an expensive or complex design. The system should also provide backward compatibility with existing pulse position modulation systems and employ accurate synchronization techniques during demodulation. Despite the apparent advantages that such a system would provide, to date, no such device provides these features.

SUMMARY OF THE INVENTION

The aforementioned problems are solved by a computer system with a networking modem capable of full duplex communication over standard telephone lines. The networking modem comprises a digital signal processor (DSP) capable of implementing a plurality of digital modulation and demodulation techniques, including pulse position modulation and quadrature phase shift keying (QPSK). The pulse position modulation ensures backward compatibility with existing phone networking systems, while the QPSK modulation provides a standard modulation technique that permits efficient development and cross platform compatibility. The networking modem may be configured to implement other modulation techniques as well, including quadrature amplitude modulation (QAM). The DSP may comprise a commercially available DSP or an application specific integrated circuit (ASIC), and may be either programmable or nonprogrammable, as desired.

The use of a digital signal processor permits a wide variety of processing options, including the capability to adjust the spectral content of the transmitted signals, resulting in maximum channel capacity and data rates. Outgoing symbols can be appropriately shaped or selected to compensate for channel conditions on the telephone line, thus reducing intersymbol interference (ISI). In addition, digital filtering and correlation processing permit robust noise performance through noise averaging. To achieve accurate synchronization during demodulation, the DSP implements a digital phase locked loop (DPLL) that recovers the timing of the incoming carrier signal. Digital techniques also permit the DSP to implement echo cancellation, further reducing ISI and permitting full duplex communication. Due to the reduced ISI and improved noise immunity, the DSP can transmit successive data symbols more closely spaced in time, thus achieving higher data rates than were possible using prior art analog receivers.

The DPLL comprises a numerically controlled oscillator (NCO) that generates a local timing signal, along with a phase detector and loop filter that compare the incoming carrier signal to the local timing signal. The loop filter provides an error signal to the NCO, and the NCO adjusts the frequency of the local timing signal until phase lock occurs with the incoming carrier signal. In a preferred embodiment, the DSP implements a carrier detector that asserts a carrier detect signal to indicate phase lock of the incoming carrier with the local timing signal. The carrier detector monitors the error signal provided by the loop filter, asserting the carrier detect signal if the error signal amplitude falls within a predetermined range. Under pulse position modulation, the DSP implements an interval counter that increments during each cycle of the local timing signal, if the carrier detect signal is deasserted. Accordingly, the counter measures the length of time between pulses of the carrier, thus providing an effective and accurate symbol detector. Because the DPLL synchronizes the counter to the incoming carrier, problems with clock drift due to differences in transmitter and receiver crystal tolerances are eliminated. The DPLL also permits a more robust and frequency selective carrier detector than do prior art techniques, which typically utilize less reliable energy detection techniques.

In addition to the digital signal processor, the networking modem comprises line coupling magnetics and amplifiers for transmitting and receiving analog signals over the telephone line, a CODEC that includes an analog to digital converter (ADC) and a digital to analog converter (DAC), and a media access controller (MAC) for interfacing to a computer system or directly to a local area network. The CODEC samples incoming analog signals received through the line coupling magnetics and passes the resulting incoming digital signals to the DSP. The DSP demodulates the incoming digital signals to detect the transmitted signals. By synchronizing directly to the timing of the incoming carrier, the DPLL eliminates the need to synchronize the receiver's local clock source with the transmitter's clock source, thus providing extremely accurate symbol timing without relying on complex and expensive synchronization techniques. The DSP provides detected symbols to the computer system via the MAC, which preferably interfaces to a PCI bus within the computer.

The DSP also receives outgoing data symbols from the computer system via the MAC and modulates the data symbols onto a carrier signal, using any of a variety of modulation techniques. Because the DSP handles multiple modulation and demodulation schemes, the networking modem is capable of communicating with a variety devices over the same telephone line, even if each device uses a different modulation scheme. In a preferred embodiment, the DSP maintains a lookup table with a variety of waveforms corresponding to each transmitted symbol. From the lookup table, the DSP selects optimum waveforms based on the spectral conditions of the telephone line, thus maximizing the channel capacity for an optimum data rate. In addition, the DSP is capable of dynamically switching symbol waveforms in order to compensate for evolving channel conditions. The DSP is capable of transmitting a first waveform to represent a symbol, for example, and subsequently transmitting a second waveform to represent the same symbol, depending on the channel conditions at the time of each transmission. The CODEC converts outgoing digital signals received from the DSP into outgoing analog signals, which are passed to the telephone line via the amplifiers and line coupling magnetics.

In an alternative embodiment, the DSP is capable of handling modulation and demodulation not only for phone line networking, but also for standard modem communications and/or DSL. The embodiment preferably comprises a V.90 data pump, a DSL data pump, and a networking data pump incorporated into one or more DSP's. The data pumps generally manage all processing for standard modem communications, DSL communications, and phone line networking, including modulation and demodulation/ detection. The data pumps communicate through an input/ output port to exchange transmitted and received symbols with an external computer. A filter bank, including a POTS filter, a UASDL filter, and a network filter, performs bandpass filtering on signals traveling between the phone line and the data pumps. A decimator receives sampled signals from the phone line and creates a custom sample stream at the appropriate rate for each data pump. The DSP further includes an interpolator that combines outgoing modulated signals from the data pump, at a sample rate suitable for transmission over the phone line.

Thus, the present invention comprises a combination of features and advantages that enable it to substantially advance the art by providing a networking modem that incorporates spectral flexibility, robust noise performance, high data rates, standard modulation techniques, full duplex communication, and backward compatibility with existing pulse position modulation systems, while eliminating problems with symbol synchronization during demodulation. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of preferred embodiments is considered in conjunction with the following drawings, in which:

FIG. 3A illustrates the timing diagram of a DPLL, a carrier detector, and a symbol delay counter implemented by the DSP of FIG. 2;

DETAILED DESCRIPTION OF THE PREFERRED EMBODIMENTS

Figure 1:
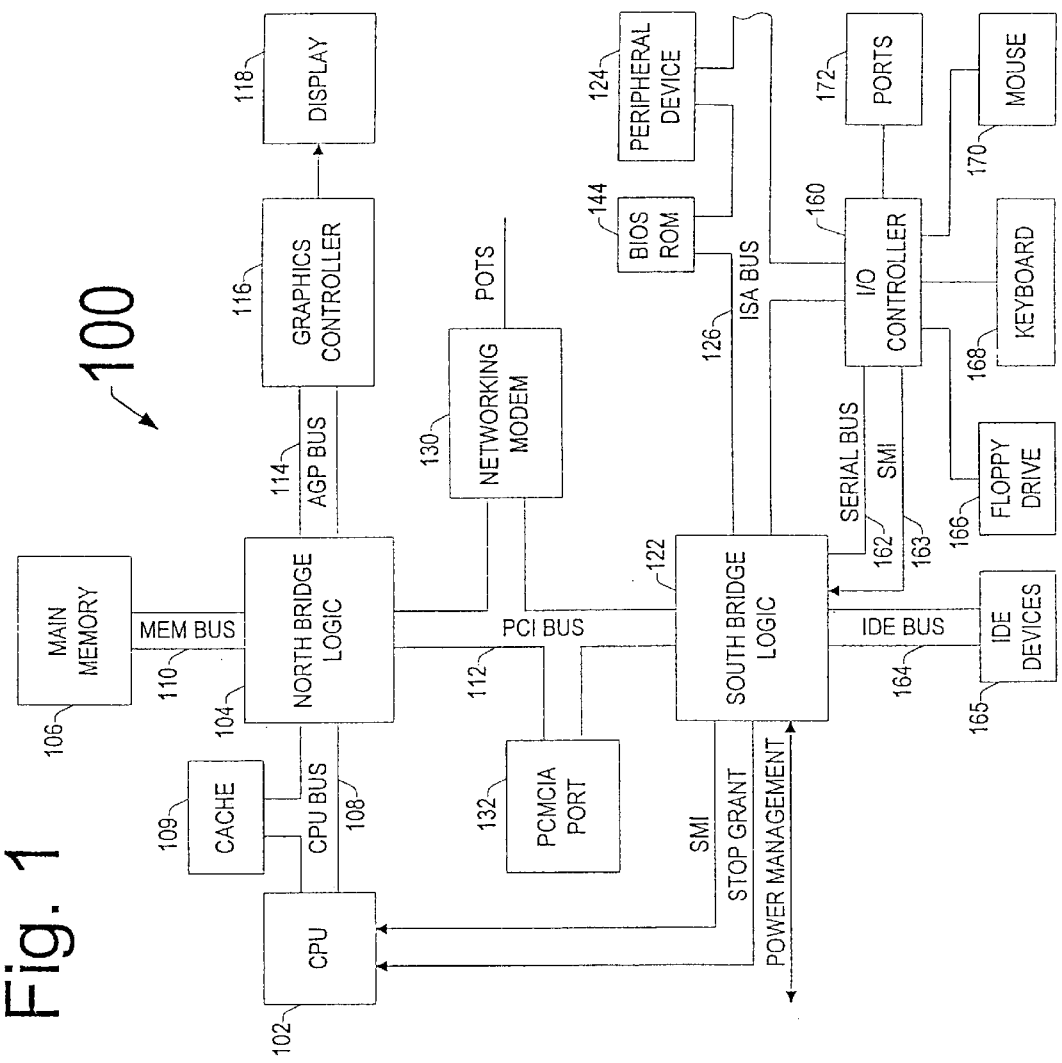
FIG. 1 illustrates the block diagram of a computer system constructed in accordance with a preferred embodiment.

FIG. 1 illustrates a computer system 100 constructed in accordance with a preferred embodiment and having a networking modem 130 for connecting to other computers (not shown) over standard telephone lines. Computer system 100 may be configured in any number of ways, including as a laptop unit, a desktop unit, a network server, or any other configuration. Computer system 100 generally includes a central processing unit (CPU) 102 coupled to a main memory array 106 and to a variety of other peripheral computer system components through an integrated bridge logic device 104. The bridge logic device 104 is sometimes referred to as a "North bridge" for no other reason than it often is depicted at the upper end of a computer system drawing. The CPU 102 preferably couples to North bridge logic 104 via a CPU bus 108, or the bridge logic 104 may be integrated into the CPU 102. The CPU 102 may comprise, for example, a Pentium® III microprocessor. It should be understood, however, that computer system 100 could include other alternative types of microprocessors. Further, an embodiment of computer system 100 may include a multiple-CPU architecture, with each processor coupled to the bridge logic unit 104. An external cache memory unit 109 further may couple to the CPU bus 108 or directly to the CPU 102.

The main memory array 106 preferably couples to the bridge logic unit 104 through a memory bus 110, and the bridge logic 104 preferably includes a memory control unit (not shown) that controls transactions to the main memory 106 by asserting the necessary control signals during memory accesses. The main memory 106 functions as the working memory for the CPU 102 and generally includes a conventional memory device or array of memory devices in which program instructions and data are stored. The main memory array may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The North bridge 104 couples the CPU 102 and memory 106 to the peripheral devices in the system through a Peripheral Component Interconnect (PCI) bus 112 or other expansion bus, such as an Extended Industry Standard Architecture (EISA) bus. The present invention, however, is not limited to any particular type of expansion bus, and thus various buses may be used, including a high speed (66 MHz or faster) PCI bus. Various peripheral devices that implement the PCI protocol may reside on the PCI bus 112, as well. The PCI devices may include any of a variety of peripheral devices such as, for example, network interface cards (NIC's), video accelerators, audio cards, hard or floppy disk drives, Small Computer Systems Interface (SCSI) adapters, and telephony cards. An additional modem, for instance, may provide a separate interface to a telephone, Integrated Services Digital Network (ISDN), or cable television line, if these services are not provided by the networking modem 130. A NIC also may be included to interface a conventional computer network.

Figure 2:
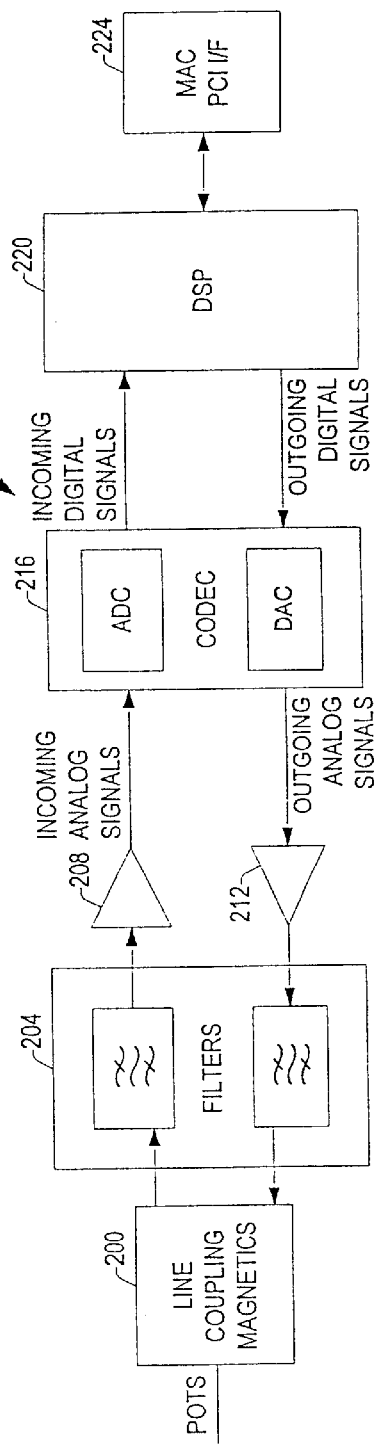
FIG. 2 illustrates a preferred embodiment of the phone line networking modem of FIG. 1.

The computer system 100 preferably includes a graphics controller 116 that couples to the bridge logic 104 via an expansion bus 112. As shown in FIG. 2, the expansion bus 112 comprises an Advanced Graphics Port (AGP) bus. Alternatively, the graphics controller 116 may couple to bridge logic 104 through the PCI bus 112. As one skilled in the art will understand, the graphics controller 116 controls the rendering of text and images on a display device 118. The graphics controller 116 may embody a typical graphics accelerator generally known in the art to render three-dimensional data structures on display 118. These data structures can be effectively shifted into and out of main memory 106 via the expansion bus 114 and bridge logic 104. The graphics controller 116 therefore may be a master of the expansion bus (including either PCI or AGP bus) enabling the graphics controller 116 to request and receive access to a target interface within the bridge logic unit 104, including the memory control unit. This mastership capability permits the graphics controller 116 to access main memory 106 without the assistance of the CPU 102. A dedicated graphics bus accommodates rapid retrieval of data from main memory 106.

As will be apparent to one skilled in the art, the bridge logic 104 includes a PCI interface to permit master cycles to be transmitted and received by bridge logic 104. The bridge logic 104 also includes an interface for initiating and receiving cycles to and from components on the AGP bus 114. The display 118 comprises any suitable electronic display device upon which an image or text can be represented. A suitable display device may include, for example, a cathode ray tube (CRT), a liquid crystal display (LCD), a thin film transistor (TFT), a virtual retinal display (VRD), or any other type of suitable display device for a computer system.

The computer system 100 optionally may include a Personal Computer Memory Card International Association (PCMCIA) drive 132 coupled to the PCI bus 112. The PCMCIA drive 132 is accessible from the outside of the computer and accepts one or more expansion cards that are housed in special PCMCIA cards, enclosures which are approximately the size of credit cards but slightly thicker. Accordingly, PCMCIA ports are particularly useful in laptop computer systems, in which space is at a premium. A PCMCIA card typically includes one connector that attaches to the PCMCIA drive 132, and additional connectors may be included for attaching cables or other devices to the card outside of the computer 100. Accordingly, various types of PCMCIA cards are available, including modem cards, network interface cards, bus controller cards, and memory expansion cards.

If other secondary expansion buses are provided in the computer system, another bridge logic device typically couples the PCI bus 112 to that expansion bus. This bridge logic is sometimes referred to as a "South bridge," reflecting its location vis-à-vis the North bridge in a typical computer system drawing. In FIG. 1, the South bridge 122 couples the PCI bus 112 to an Industry Standard Architecture (ISA) bus 126 and to an Integrated Drive Electronics (IDE) bus 164. The IDE bus 164 typically interfaces input and output devices such as a CD ROM drive, a Digital Video Disc (DVD) drive, a hard disk drive, and one or more floppy disk drives. Various ISA-compatible devices are shown coupled to the ISA bus 126, including a BIOS ROM 144. The BIOS ROM 144 is a memory device that stores commands which instruct the computer how to perform basic functions such as sending video data to the display or accessing data on hard floppy disk drives. In addition, the BIOS ROM 144 may be used to store power management instructions for hardware-based (or "legacy") power management systems or to store register definitions for software-based power management systems. The BIOS instructions also enable the computer to load the operating system software program into main memory during system initialization, also known as the "boot" sequence. The BIOS ROM 144 typically is a "non-volatile" memory device, which means that the memory contents remain intact even when the computer 100 powers down. By contrast, the contents of the main memory 106 typically are "volatile" and thus are lost when the computer shuts down.

The South bridge 122 preferably supports an input/output (I/O) controller 160 that operatively couples to basic input/output devices such as a keyboard 168, a mouse 170, a floppy disk drive 166, general purpose parallel and serial ports 172, and various input switches such as a power switch and a sleep switch (not shown). The I/O controller 160 typically couples to the South bridge via a standard bus, shown as the ISA bus 126 in FIG. 1. A serial bus 162, which generally is a bus with only one data signal, may provide an additional connection between the I/O controller 160 and South bridge 122. The I/O controller 160 typically includes an ISA bus interface (not specifically shown) and transmit and receive registers (not specifically shown) for exchanging data with the South bridge 122 over the serial bus 162.

Under the operating system control, the South bridge or other component within the computer system typically manages power functions using the Advanced Configuration and Power Interface (ACPI) protocol. Power management functions include, for example, reducing or terminating power to components such as the floppy drive 166, gating the clock signals that drive components such as the North bridge 104 and CPU 102, and initiating sleep mode transitions on the peripheral buses 112 and 126. For example, the South bridge 122 provides a STOP GRANT signal to the CPU 102 to halt CPU operation when placing the computer into a sleep mode. The I/O controller 160 asserts SMI signals 163 to the South Bridge in response to certain input signals, for example a signal from a power button to wake the computer 100 from sleep mode. The I/O controller 160 typically incorporates a counter or a Real Time Clock (RTC) to track the activities of certain components such as the hard drive and the PCI bus 112, inducing sleep mode after a predetermined time of inactivity.

Referring now to FIG. 2, networking modem 130 is capable of connecting computer system 100 to other computers for communication over a standard POTS telephone line. Constructed in accordance with a preferred embodiment, the modem 130 generally comprises a digital signal processor (DSP) 220 coupled to a coder/decoder (CODEC) 216 and to a media access controller (MAC) 224. The CODEC 216 further couples to an output amplifier 208 and an input amplifier 212 that connect to a filter bank 204. The filter bank 204 connects to the POTS via standard line coupling magnetics 200. The network modem 130 preferably represents an expansion card or chip set enclosed within the computer system 100, although the modem 130 may be constructed as an external standalone device if desired. Accordingly, the network modem 130 may be manufactured integrally with computer system 100 or as a separate device for internal or external use.

The MAC 224 provides a physical layer interface that connects the network modem 130 to an external computing device, network, or communications channel. In a preferred embodiment, the MAC 224 comprises a PCI interface that enables the network modem 130 to connect to computer system 100 via the PCI bus 112. In alternative embodiments, however, the MAC 224 may comprise any one of a variety of interfaces for connecting the network modem 130 to other types of computer buses, computer networks, or communications channels. The MAC 224, for example, may be designed to interface the network modem 130 to the computer via the ISA (or EISA) bus 126, the PCMCIA drive 132, a parallel or serial port 172, by way of a USB or IEEE 1394 port, or through any other desired route. If the MAC 224 functions as a PCMCIA interface, then the network modem 130 may be enclosed within a PCMCIA expansion card (or "credit card") package. In other embodiments, the MAC 224 serves as a LAN interface (e.g., an Ethernet interface) or an interface to another type of network. In another alternative embodiment, the MAC 224 interfaces to an additional POTS line, a wireless transmitter/receiver, or any other type of communications channel. Examples of suitable MAC's include part number Am79C972, a MAC/Ethernet controller with a PCI interface, and part number Am79C90, a MAC/Ethernet controller without a PCI interface, both manufactured by Advanced Micro Devices, Inc.

The DSP 220 belongs to the general class of processing devices that accepts one or more digital input signals and produces one or more digital output signals, using interfaces to external data ports for sending and receiving the digital data in real-time. A digital signal is characterized by discrete values that exist at discrete moments in time, in contrast with analog signals, which can manifest values over a continuous range at any point in time. Digital signals often are used to represent analog signals by measuring, or "sampling," the analog signal at various points in time and assigning, or "quantizing," each sample to one of the available digital values, for example by rounding the sample to the nearest available digital value. Digital signals can represent pure digital information, as well.

Digital signals processors handle data using a variety of techniques, including linear or non-linear processing, time-invariant or time-varying processing, and fixed or floating point processing. Further, DSP's can be either "programmable" or "dedicated" devices. Programmable devices operate according to instructions which typically are stored in memory prior to operation. Dedicated processors are "hardwired" to a specific algorithm or class of algorithms. A DSP, either dedicated or programmable, may be designed as a custom part, such as an Application Specific Integrated Circuit (ASIC), or may be purchased commercially from a wide array of vendors.

Digital signal processors typically operate on millions of samples per second, perform rapid memory accesses, and are computationally very demanding, often performing as many as a few hundred operations on each sample processed. These real-time capabilities often are beyond the capabilities of many general purpose processors, so DSP's often are used to augment or replace general purpose processors in electronic processing systems. In some cases, however, certain high performance general purpose processors may be capable of performing the functions of a DSP, either through programmed software instructions or through DSP circuitry integrated into the processor. For this reason and because of various tradeoffs in using a general purpose processors versus a digital signal processor, hybrid processors have been developed that incorporate the features of both digital signal processors and general purpose devices.

In a preferred embodiment, DSP 220 represents a programmable digital signal processor that is distinct from the central processing unit 102. The DSP 220 could, however, comprise a dedicated, or nonprogrammable, device if desired. The DSP 220 generally processes digital data received from the POTS line and prepares digital data to be transmitted over the POTS line. The DSP 220 also is configured with instructions to permit establishing connections with other devices on the POTS network, although the software driver may handle this function if desired. DSP 220 may comprise any standard commercial digital signal processor or may be designed as a custom Application Specific Integrated Circuit (ASIC). In addition, the DSP 220 functions could be handled by the CPU 102 if desired. If the CPU 102 performs the functions of the DSP 220, then the MAC 224 may be used to interface the CODEC 216 directly to the CPU 102 via the expansion bus 112. The DSP 220 preferably relies on an off chip crystal or another external clock signal for circuit timing, although an internal clock source may be used.

To store operational instructions and program parameters, the DSP 220 preferably includes an onboard instruction memory, although the DSP 220 may couple to an external instruction memory if desired. The instruction memory preferably is nonvolatile, meaning that the data does not vanish when the power is removed. Note that any desired type of internal or external instruction memory may be used, including standard read only memory (ROM), programmable ROM (PROM), erasable PROM (EPROM), electrically erasable read only memory (EEPROM), or any other type of memory. If an onboard instruction memory is implemented, a standard ROM is preferred. An EEPROM, however, is preferred as an external memory. If desired, the DSP operating instructions can be downloaded to the DSP 220 from the computer system 100 prior to operation, eliminating the need for an onboard instruction memory. In a preferred embodiment, the DSP 220 further includes an internal data memory for storing data and intermediate results used during processing. The data memory may reside externally to the DSP 220, however, or the DSP 220 may utilize an offboard memory, such as memory 106, if desired. The data memory preferably is volatile, meaning that the data contents vanish when power is removed.

The instruction memory preferably includes a symbol lookup table (not shown) that stores digital samples of the symbol waveforms to be transmitted over the POTS lines. Preferably, the symbol lookup table is copied to the data memory for faster access. Each sample represents the voltage value of the symbol waveform at a discrete moment in time. The DSP 220 creates an outgoing digital signal for transmission over the POTS line by reading symbol waveforms from the symbol lookup table based on the data to be transmitted. Because the POTS line carries analog signals, the DSP 220 transmits outgoing digital signals to the CODEC 216, which uses the internal ADC to convert the sequences of digital samples into outgoing analog signals.

The line coupling magnetics 200, filters 204, and input and output amplifiers 208 and 212 provide a standard analog interface to the POTS line. The line coupling magnetics include a 2–4 wire conversion hybrid, a line impedance matching transformer, over voltage/current protection, and/or any other element(s) for inducing and responding to voltage/current fluctuations in the POTS line. Examples of magnetics include part number B6305, manufactured by Pulse Engineering, Inc.; part number EPB5036G, manufactured by PCA Electronics, Inc.; and part number 671-7952, manufactured by Midcom, Inc.

The filter bank 204 includes filters for signals received form the POTS line and filters for signals received from the CODEC 216 via the output amplifier 212. The filters 204 preferably comprise "brick wall" bandpass filters that pass the frequency band over which the network modem 130 communicates. In a preferred embodiment, this frequency band ranges from approximately 2 MHz to 10 MHz, although any frequency band is acceptable. These frequencies ensure compatibility with existing phone networking systems and minimize interference within the lower frequency bands occupied by basic telephone and DSL services, without requiring excessive filter complexity. In fact, a $3^{rd}$ to $5^{th}$ order Chebyshev or elliptical filter should provide adequate out of band rejection, although any suitable filtering scheme may be implemented. In a preferred embodiment, the frequency response is fixed, although the filters may be tunable if desired.

The amplifiers 208 and 212 adjust the signals leaving and entering the modem 130 to the appropriate voltage level. Accordingly, the CODEC 216 receives filtered POTS signals from the input amplifier 212 at the appropriate voltage levels and supplies outgoing signals to the POTS via the output amplifier 208, which adjusts the outgoing signals for POTS levels and drives output filters in the filter bank 204.

The CODEC 216 generally comprises an analog to digital converter (ADC) and a digital to analog converter (DAC) for converting between the analog POTS signals and the digital signals processed by the DSP 220. Because the POTS line carries analog signals, the line coupling magnetics 200, filters 204, and amplifiers 208 and 212 also process analog signals. In contrast, the DSP 220 and MAC 224 process digital signals. To perform the analog/digital conversions, the ADC periodically samples the incoming analog signals from the POTS line and provides each sample as a binary, digital value to the DSP 220. Similarly, the DAC periodically reads the outgoing binary-encoded, digital signals from the DSP 220, converts the digital signals into analog waveforms, and sends the resulting outgoing analog signals to the POTS line via the analog components 208, 204, and 200. Examples of analog to digital converters include part numbers ADS 822 and ADS 805, both manufactured by Burr Brown Corp. Examples of digital to analog converters include part numbers DAC 7800 and DAC 7801, also manufactured by Burr Brown Corp.

Although the POTS line carries analog signals, the analog signals are encoded with digital data. To transmit digital data using analog signals, each piece of digital data is assigned a distinct analog waveform known as a "symbol." A sequence of digital data is transmitted by sending the corresponding sequence of symbol waveforms over the POTS line, one symbol at a time. Although the symbol waveforms occupy a continuous range of voltages that change continuously over time (hence the analog nature of the waveforms), only a finite number of symbols are used, and the symbols are transmitted beginning at discrete moments in time (hence the digital nature of the data).

During normal operation, the CPU 102 is configured to interact with the modem 130, including exchanging digital data, addresses, and control signals, through a software driver loaded into main memory 106 and executed by the processor. The CPU 102 also may perform high level processing (e.g., error correction, selecting a modulation technique, implementing a TCP/IP stack), if desired. The MAC 224 receives the outgoing digital data from the computer system 100 via the PCI bus 112. The DSP 220 then selects an appropriate symbol for the data received from the computer 100 and transmits the symbol as an outgoing digital signal. The outgoing digital signal generally comprises a pulse or carrier signal that is modulated by the outgoing digital data. Similarly, the DSP 220 receives incoming digital signals embedded with incoming digital data. After demodulating the incoming signals to detect the incoming data symbols, the DSP 220 transfers the resulting data to the CPU 102 via the MAC 224. Instead of interacting directly with the CPU 102, the networking modem 130 may write data directly to main memory 106 using the direct memory access (DMA) protocol.

The CODEC 216 transmits outgoing analog signals to output amplifier 208, which amplifies the outgoing analog signals to the proper voltage levels for transmission over the POTS line. The amplified outgoing analog signals then pass through the bandpass filters 204, which eliminate signal components outside of the frequency band used for phone line networking. Signals received from the POTS line are processed in the opposite direction from that of transmitted signals. The bandpass filters 204 accept only incoming signals within the suitable frequency band for phone line networking. The bandpass filters 204 then feed the incoming analog signals to the input amplifier 212, which drives the CODEC 216 at the proper voltage level. Within the CODEC 216, the DAC periodically samples the incoming analog signals to create incoming digital signals. Accordingly, the incoming digital signals comprise sequences of signal samples which are input to the DSP 220.

The networking modem 130 preferably supports a plurality of modulation techniques, to ensure compatibility with a variety of networking protocols. To provide backward compatibility with existing systems, the DSP 220 preferably is capable of transmitting and receiving pulse position modulated (PPM) signals. To ensure compatibility with a wide range of communications systems, the DSP 220 preferably modulates and demodulates using the quadrature phase shift keying (QPSK) technique. The DSP 220 may implement other modulation techniques, as well, such as quadrature amplitude modulation (QAM).

The DSP 220 preferably recovers the timing of received carrier signals in order to derive a timing source for demodulating received symbols. In contrast, prior art PPM receivers typically use a local clock source, such as a crystal oscillator, for timing. One problem associated with demodulating in sync with a local timing source is that the local timing source may fail to coincide with the actual timing of the received signal. Signals transmitted over the network typically are synchronized with a local clock source in the transmitter. If the transmitter clock and receiver clock do not operate at the exact same frequency, then the receiver may experience problems detecting the transmitted symbols. Even under the unlikely condition that the transmit and receive clocks do operate at precisely the same frequency, the clock phases typically must be aligned for proper receiver operation. More often, the transmit and receive clocks operate at slightly different frequencies, causing the local receiver timing to drift in phase compared to the timing of the received symbols. In addition, most crystal oscillators drift somewhat in frequency during normal operation, making it increasingly difficult to synchronize two different crystals.

FIG. 3A illustrates a timing diagram representing the preferred method for recovering the carrier timing from received signals under PPM, so that the receiver may rely on the timing of the transmitter. The incoming digital signal, representing the received signal, comprises a series of carrier pulses during intervals C1, C2, C3, and C4, with delay periods D1, D2, and D3 falling between the pulses. As explained above, the delay periods D1, D2, and D3 vary in length according to the data being transmitted. During the carrier pulses, the DSP 220 uses a phase locked loop (PLL)

technique to generate a carrier timing signal that is synchronized with the phase and frequency of the carrier pulses. The data capacity, measured by the number of bits that can be encoded in each transmitted symbol, is determined by the resolution of the interval counter and how closely it tracks the timing of the PPM modulator. After each carrier pulse, the DSP 220 continues to generate the carrier timing signal at approximately the same phase and frequency as during the previous carrier pulse.

A carrier detector circuit monitors the incoming digital signal, asserting a carrier detect (CD) signal to a high logic level during the carrier pulses. Thus, as depicted in FIG. 3A the CD signal is asserted during carrier intervals C1, C2, C3, and C4 and deasserted during delay periods D1, D2, and D3. Deasserting the CD signal during each delay period enables a counter that measures the length of the delay. The counter is synchronized to the carrier timing signal, since the carrier timing signal does not deviate significantly from the actual carrier phase during the delay intervals. Accordingly, the value of the counter at the end of each delay period corresponds accurately to one of the transmitted symbols. Locking the carrier timing signal to the transmitter clock in this manner compensates for manufacturing tolerances, such as oscillation frequency and frequency drift, between the transmitter and receiver crystals. The use of a PLL also provides better frequency discrimination than conventional carrier detectors, which often rely on detecting signal energy and thus are susceptible to interfering signals and noise.

Figure 3C:
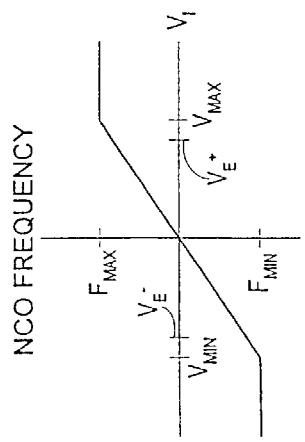
FIG. 3C illustrates the transfer function of the NCO implemented by the DPLL of FIG. 3B.
Figure 3B:
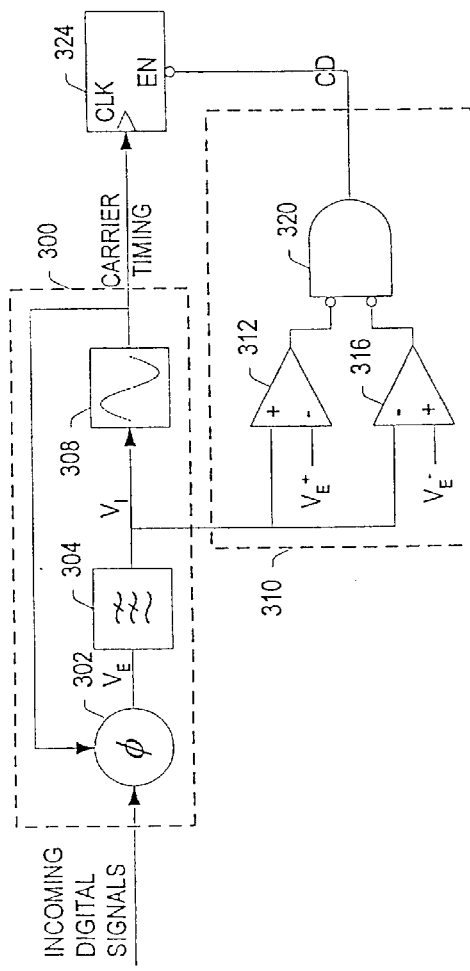
FIG. 3B illustrates a schematic diagram of the DPLL, carrier detector, and symbol delay counter constructed in accordance with a preferred embodiment.

FIG. 3B illustrates the signal flow and processing diagram of the DPLL 300, the carrier detector 310, and the counter 324. The DPLL 300 receives the incoming digital signal and provides a carrier timing signal to the counter 324. The DPLL 300 also provides a voltage adjustment signal $V_i$ to the carrier detector 310, which asserts the CD signal to the counter 324 based on the value of $V_i$. The DPLL 300, carrier detector 310, and counter 324 preferably are implemented using digital signal processing algorithms in the DSP 220, and thus each of the circuit elements and signals depicted in FIG. 3B corresponds to one or more processing functions, variables, registers, or algorithms executable by the DSP 220. If desired, however, the DPLL 300, carrier detector 310, and clock 324 may be implemented using dedicated circuitry or through software running on another component, such as the CPU 102. If dedicated circuitry is used, a standard voltage controlled oscillator (VCO) may perform the function of the NCO 308.

The DPLL 300 generally comprises a numerically controlled oscillator 308 that generates a carrier timing signal and a phase detector 302 that compares the incoming digital signal to the carrier timing signal. The phase detector 302 outputs an error voltage $V_e$ indicating the instantaneous phase error of the NCO carrier timing signal with respect to the incoming digital signal. An error voltage $V_e$ greater than zero indicates that the carrier timing signal is lagging with respect to the received carrier, and an error voltage $V_e$ less than zero indicates that the carrier timing signal is leading the received carrier. An error voltage of zero indicates that the received carrier and NCO timing signal are in phase. A loop filter 304 integrates, or averages, the error voltage $V_e$ over a period of time. The output of the loop filter 304 comprises an adjustment voltage $V_i$ that is provided to the NCO 308 as a control input signal.

An adjustment voltage $V_i$ less than zero indicates that the NCO timing signal is leading the received carrier, and an adjustment voltage $V_i$ greater than zero indicates that the NCO timing signal is lagging the received carrier. An adjustment voltage of zero indicates that the NCO timing signal is synchronized in phase and frequency (or "phase locked") with the received carrier. Accordingly, the NCO 308 oscillates at a center frequency equal to the expected carrier frequency of the received signal, deviating from the center frequency in proportion to the adjustment voltage $V_i$.

FIG. 3C illustrates the response of the NCO 308 to the adjustment voltage, according to a preferred embodiment. The behavior of the NCO 308 is generally characterized by a minimum adjustment voltage $V_{min}$ and a maximum adjustment voltage $V_{max}$. When the adjustment voltage $V_i$ is equal to or below the minimum adjustment voltage $V_{min}$, the NCO 308 outputs a minimum frequency $f_{min}$ approximately 0.05% below the center frequency. Similarly, the NCO 308 outputs a maximum frequency $f_{max}$ approximately 0.05% above the center frequency when the adjustment voltage is equal to or greater than the maximum adjustment voltage $V_{max}$. Between the $V_{min}$ and $V_{max}$, the NCO frequency varies linearly between $f_{min}$ and $f_{max}$, passing through the NCO center frequency directly between the maximum and minimum adjustment voltages $V_{min}$ and $V_{max}$. Note that the transfer function depicted in FIG. 3C is merely illustrative of a preferred embodiment and that the NCO 308 response may deviate significantly from the curve shown in FIG. 3C without departing from the principles of this disclosure.

Referring to FIGS. 3A and 3B, the NCO 308 preferably comprises a phase register and a frequency register (not shown) which dictate the oscillation frequency of the carrier timing signal. The carrier timing signal preferably comprises a sinusoidal function represented by any desired number of bits, although it is contemplated that the precision is comparable to that of the incoming digital signal. The NCO 308 operates synchronously according to the local timing of the DSP 220. On each clock edge of the DSP clock, the NCO 308 adds the contents of the phase and frequency registers, storing the resulting sum back into the phase register. Because the phase register comprises a finite number of bits, the phase register periodically overflows at a frequency corresponding to the value in the frequency register. Accordingly, the value of the phase register represents the instantaneous phase of the carrier timing signal, and thus the carrier timing signal can be generated by calculating the sine or cosine of the phase. In order to conserve processing cycles, the sine or cosine value preferably is read from a sine lookup table, using the phase as an address to the table. In another embodiment, the NCO timing signal comprises an approximation or estimation of the sinusoidal value. The most significant bit of the phase value, for example, may be used as a one bit estimate of the sine or cosine. The sine or cosine values also may be approximated to reduce the amount of memory required to store the waveform samples.

If the NCO timing signal is not phase locked to the carrier during one of the carrier pulses C1–4, the adjustment voltage $V_i$ will rise or fall according to the phase discrepancy between the received carrier and the NCO timing signal. The DSP 220 responds to changes in $V_i$ by adjusting the rate value in the NCO frequency register until phase lock occurs. To compensate for a lagging NCO timing signal, indicated by $V_i$ greater than zero, the DSP 220 raises the rate value stored in the frequency register. Similarly, to compensate for a leading NCO timing signal, indicated by $V_i$ less than zero, the DSP 220 lowers the rate value. During phase lock, the value of the adjustment voltage $V_i$ remains at a steady state value that is indicative of the actual received carrier frequency.

As depicted in FIG. 3C, the NCO response curve includes a negative threshold error voltage $V_e^-$ value, which is slightly greater than the minimum adjustment voltage, and a positive threshold error voltage $V_i$ value, which is slightly less than the maximum adjustment voltage. In a preferred embodiment, the threshold values $V_e^-$ and $V_i$ correspond to carrier frequencies that deviate from the center carrier frequency by an unacceptable tolerance. Accordingly, if no carrier signal is present or if the carrier signal disappears, the adjustment voltage $V_i$ will exceed either the $V_e^-$ or $V_i$ threshold. As depicted in FIG. 3A, $V_i$ occupies a steady state value between the thresholds $V_i$ and $V_e^-$ during the carrier pulses C1–4. In the example shown, the adjustment voltage $V_i$ exceeds $V_i$ during the delay intervals D1–3.

Referring again to FIG. 3B, the carrier detector 310 detects the presence of a carrier signal by monitoring the adjustment voltage $V_i$. The carrier detector 310 comprises an upper threshold comparator 312, a lower threshold comparator 316, and a NOR gate 320. The upper threshold comparator 312 asserts one input terminal of the NOR gate 320 if $V_i$ rises above $V_e^+$, and the lower threshold comparator 316 asserts the other input terminal of the NOR gate 320 if $V_i$ falls below $V_e^-$. If neither input terminal of the NOR gate 320 is asserted, indicating that $V_i$ is between the threshold values $V_e^-$ and $V_e^+$, the NOR gate 320 asserts a carrier detect logic signal (CD) to indicate the presence of a carrier in the incoming digital signals. As illustrated, the CD signal is an active high signal, meaning that it occupies a logic high level if asserted or a logic low level if deasserted. If the carrier disappears, $V_i$ will exceed one of the thresholds $V_e^-$ or $V_e^+$, causing either comparator 316 or comparator 312 to assert the input terminal of NOR gate 320. In response, the NOR gate 320 deasserts the CD signal to indicate the absence of a carrier signal.

The counter 324 includes a CLK input pin for synchronization and an active low EN input pin that enables counting operation. As shown in FIG. 3B, the CLK pin is driven by the carrier timing signal from the NCO 308, and the CD signal from the carrier detector controls the EN pin. When the EN pin is asserted low by the CD signal, the counter resets to zero and enters counting mode. During counting mode, the value of the counter increments once on each active edge (i.e., rising or falling edge) of the carrier timing input signal on the CLK pin. When the CD signal deasserts the EN pin high, the counter 324 stops counting. The DSP 220, CPU 102, or other device then may read the counter value to determine the length of the delay period.

Figure 4:
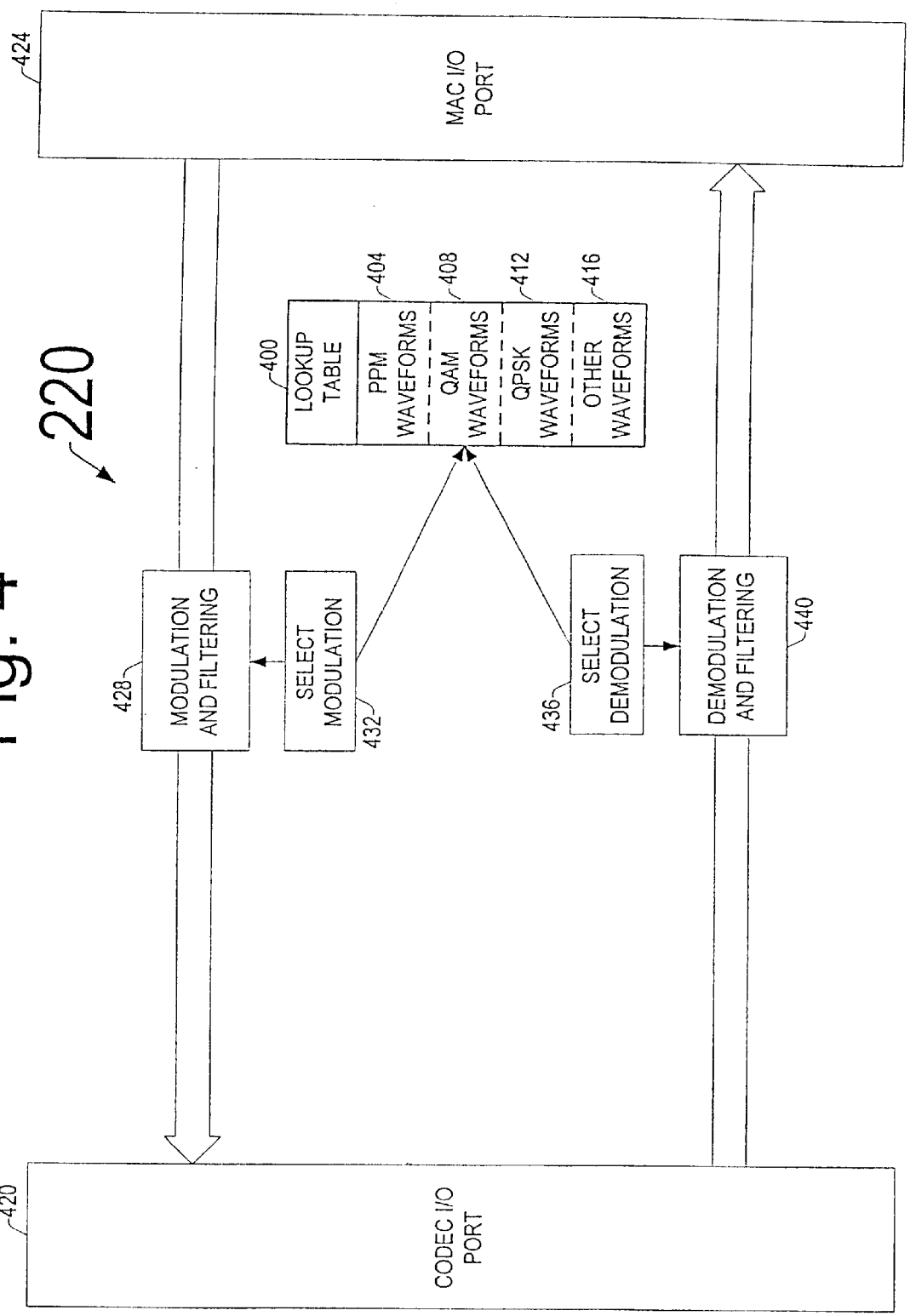
FIG. 4 illustrates a preferred embodiment of the processing architecture of the DSP of FIG. 2.

FIG. 4 illustrates a block diagram of the processing flow within DSP 220. Sample stream data generally enters and exits the DSP 220 through input/output (I/O) ports 420 and 424. I/O port 420 represents data flowing between the DSP 220 the CODEC 216, while the I/O port 424 represents data flowing between the DSP 220 and the MAC 224. Note that I/O ports 420 and 424 may be implemented using the same or different physical ports within the DSP 220, as desired. The ports 420 and 424 are illustrated using different physical blocks in FIG. 4 to more clearly indicate the signal flow.

FIG. 4 further illustrates a symbol lookup table 400 that stores the sample waveforms for each type of modulation technique. The symbol lookup table preferably includes waveforms for pulse position modulation (PPM) 404, quadrature amplitude modulation (QAM) 408, and quadrature phase shift keying (QPSK) 412. Other waveform samples 416 may be included, as desired. As explained above, the DSP 220 preferably constructs transmitted waveforms by reading samples from the appropriate location in the lookup table 400.

The DSP 220 further includes routines for selecting a modulation technique (block 432), modulating and filtering outgoing data (block 428), selecting a demodulation technique (block 436), and demodulating and filtering incoming data (block 440). The modulation selection routine 432 determines the appropriate modulation technique through communication with the host processor 106 in computer system 100 or through any other manner as desired. Note that the networking modem 130 may switch between multiple modulation techniques if necessary to communicate with various other computer systems or other devices over the POTS line.

Once the modulation technique is selected, the modulation selection routine 432 determines which region in the lookup table 400 holds the waveform samples for the selected modulation scheme. The modulation and filtering routine 428 then creates an outgoing digital signal based on data received through the MAC port 424 by selecting waveform samples from the chosen region in the lookup table 424. The modulation and filtering routine 428 optionally bandpass filters the modulated data prior to transmitting the outgoing digital signal through the CODEC I/O buffer 420. The bandpass filtering preferably attenuates frequencies below approximately 4 megahertz (MHz) and above 8 MHz, although any desired cutoff frequencies or other filter characteristics may be implemented as needed.

Similarly, the demodulation selection routine 436 determines the appropriate demodulation technique for data received over the POTS line. As with the modulation selection routine, the chosen demodulation scheme may be determined through communication with other networked devices, in conjunction with the host processor 106, or in any other manner. Further, the DSP 220 may rotate among a plurality of demodulation schemes to accommodate the communication protocols supported by other devices transmitting over the POTS line.

The demodulation bandpass filtering preferably suppresses frequencies below approximately 4 megahertz (MHz) and above 8 MHz, although any desired cutoff frequencies or other filter characteristics may be implemented as needed. The demodulation selection routine 436 indicates the chosen demodulation technique to the demodulation and filtering routine 440, which decodes the incoming digital signal from the CODEC I/O port 420. Any suitable detection algorithm may be implemented, such as correlation or matched filter detection, although a preferred embodiment contemplates correlation. The demodulation and filtering routine 440 optionally bandpass filters the modulated data prior to transmitting the outgoing digital signal through the CODEC I/O buffer 420. After demodulation, incoming data values are passed to the computer system 100 via the MAC I/O port 424.

To transmit signals using pulse position modulation, the DSP 220 generates pulse waveforms that are delayed according to the transmitted data values being. The delay value, measured from the beginning of the pulse period, is marked by the point at which the transmitted waveform exceeds the predetermined voltage threshold. Note that the voltage threshold may be different from the voltage threshold for incoming signals. In a preferred embodiment, the DSP 220 generates each pulse waveform by reading samples corresponding to the transmitted data value from the lookup table. Under alternative embodiments, the DSP 220 may modulate a carrier signal in real time, using conventional methods such as multiplication and phase shifting.

Because the telephone line conditions may change periodically, affecting the transmitted signal, the DSP 220 preferably is capable of transmitting a variety of waveforms that compensate for various channel characteristics. For each symbol, the lookup table 400 stores a group of waveforms corresponding to that symbol. Each of the waveforms in a particular group is configured to compensate for a different channel effect. The DSP 220 preferably evaluates the channel characteristics when the networking connection is first made, and the channel characteristics may be updated periodically throughout operation if desired. Note that the networking modem 130 is not required to measure the channel conditions directly. The DSP 220 may measure the information directly, or it may receive information on the channel condition from any other device, including another networking device and/or computer system 100. According to the channel characteristics, the DSP 220 selects an optimum waveform for each data value that best compensates for the channel. Accordingly, the DSP 220 may select different waveforms for the same data value transmitted at different times, in order to compensate for evolving channel effects.

Other types of digital modulation, such as pulse amplitude modulation (PAM) and phase shift keying (PSK), typically are performed by modulating the amplitude and/or phase of a carrier signal based on the data being transmitted. The carrier signal can be any suitable waveform, such as a sinusoidal signal (i.e., a sine or cosine signal), or a special signal designed to mitigate interference between successive symbols, such as a raised cosine pulse or a duobinary pulse. The carrier signal often is characterized by a periodic pulse that rises and then decays during the duration of the data symbol. The amplitude represents the highest absolute value (or the "envelope") of the carrier, while the phase represents a time shift, if any, in transmitting the carrier. The amplitude of a particular pulse is modulated by multiplying the carrier signal by a constant value during the symbol period, while the phase is modulated by advancing or delaying the carrier in time. A symbol can modulate a carrier by changing the carrier amplitude only, the phase only, or both the amplitude and phase. Each particular combination of amplitude modulation and phase modulation represents a single symbol.

Under PAM, each amplitude value represents a particular data symbol. To transmit a sequence of symbols using PAM, the carrier is multiplied by a sequence of values representing the symbols. Each amplitude value represents one symbol, although multiple amplitude values may represent the same symbol if desired. Table I illustrates an example of a PAM "codebook" that defines a set of multipliers for each of four arbitrary symbols "A," "B," "C," and "D." The third column lists the signal that is transmitted if the carrier is represented by s(t).

TABLE I

Pulse Amplitude Modulation using four symbols.

| Symbol | Pulse Multiplier | Transmitted Signal |
|---|---|---|
| A | −3 | −3*s(t) |
| B | −1 | −s(t) |
| C | +1 | s(t) |
| D | +3 | 3*s(t) |

The carrier is multiplied by the value −3 to encode the symbol A. Similarly, the symbols B, C, and D are created by multiplying the carrier by −1, +1, and +3, respectively. To transmit the sequence of symbols {A, B, D, C, A} at times $t_1$, $t_2$, $t_3$, $t_4$, and $t_5$, for example, the carrier is multiplied by −3 (corresponding to symbol A) at time $t_1$, multiplied by −1 (corresponding to symbol B) at time $t_2$, multiplied by +3 (corresponding to symbol D) at time $t_3$, multiplied by +1 (corresponding to symbol C) at time $t_4$, and multiplied by −3 (corresponding to symbol A) at time $t_5$. Expression (1) represents the corresponding transmitted signal:

$$-3*s(t-t_1)-s(t-t_2)+3*s(t-t_3)+s(t-t_4)-3*s(t-t_5) \qquad (1)$$

Although PAM generally involves modulating the carrier by multiplying the amplitude without changing the phase, a variant of PAM, called quadrature amplitude modulation (QAM), involves changing both the amplitude and phase of the pulse. To transmit a sequence of symbols using QAM, the carrier is multiplied by a series of amplitude values and shifted by a series of phase values. Each amplitude/phase pair represents one symbol, although multiple amplitude phase pairs may represent the same symbol if desired. Table II illustrates an example of a QAM code book that defines a set of amplitudes and phases for eight symbols A–H. The fourth column lists the signal that is transmitted if the carrier pulse is represented by s(t).

TABLE II

Quadrature Amplitude Modulation using eight symbols.

| Symbol | Amplitude | Phase | Transmitted Signal |
|---|---|---|---|
| A | +1 | 0° | s(t) |
| B | +1 | 90° | s(t-90°) |
| C | +1 | 180° | s(t-180°) |
| D | +1 | 270° | s(t-270°) |
| E | +3 | 0° | 3*s(t) |
| F | +3 | 90° | 3*s(t-90°) |
| G | +3 | 180° | 3*s(t-180°) |
| H | +3 | 270° | 3*s(t-270°) |

The carrier is multiplied by the value +1 and shifted by 0° to encode the symbol A (note that a 0° shift is equivalent to no shift at all, and multiplying by +1 does not alter the amplitude of the carrier). Similarly, the carrier pulse is multiplied by the value +1 and shifted by 90° to encode the symbol B. Likewise, the symbols C–H are created by modulating carrier pulses by the following amplitude/phase pairs: +1/180° (symbol C), +3/0° (symbol D), +3/0° (symbol E), +3/90° (symbol F), +3/180° (symbol G), and +3/270° (symbol H). To transmit the sequence of symbols {A, F, H, B} at times $t_1$, $t_2$, $t_3$, and $t_4$, for example, the carrier is modulated by amplitude +1 and phase 0° (corresponding to symbol A) at time $t_1$, amplitude +3 and phase 90° (corresponding to symbol F) at time $t_2$, amplitude +3 and phase 270° (corresponding to symbol H) at time $t_3$, and amplitude +1 and phase 90° (corresponding to symbol B) at time $t_4$. Expression (2) represents the corresponding transmitted signal:

$$s(t-t_1)+3*s(t-t_2\_90°)+3*s(t-t_3-270°)+s(t-t_4-90°) \qquad (2)$$

PSK generally involves modulating each carrier pulse by shifting the phase without changing the changing the amplitude. If phases other than 0° and 180° are used, then PSK is more specifically called "quadrature" PSK, or QPSK. Under PSK, each phase shift value represents a particular data symbol. To transmit a sequence of symbols using PSK, each successive pulse is shifted by the phase that represents one of the symbols in the sequence. Each phase shift represents one symbol, although multiple phases may represent the same symbol if desired. Table III illustrates an example of a QPSK code book that defines phases representing the four symbols A–D. The third column lists the signal that is transmitted if the carrier pulse is represented by s(t).

TABLE III

Phase Shift Keying (PSK) using four symbols.

| Symbol | Phase | Transmitted Signal |
|---|---|---|
| A | 0° | s(t) |
| B | 90° | s(t-90°) |
| C | 180° | s(t-180°) |
| D | 270° | s(t-270°) |

The carrier is shifted by 0° to encode the symbol A. Similarly, the symbols B, C, and D are created by shifting the carrier by 90°, 180°, and 270°, respectively. To transmit the sequence of symbols {A, B, D, C, A} at times $t_1$, $t_2$, $t_3$, $t_4$, and $t_5$, for example, the carrier is shifted by 0° (corresponding to symbol A) at time $t_1$, shifted by 90° (corresponding to symbol B) at time $t_2$, shifted by 270° (corresponding to symbol D) at time $t_3$, shifted by 180° (corresponding to symbol C) at time $t_4$, and again shifted by 0° (corresponding to symbol A) at time $t_5$. Expression (3) represents the corresponding transmitted signal:

$$s(t-t_1)+s(t-t_2-90°)+s(t-t_3-270°)+s(t-t_4-180°)+s(t-t_5) \quad (3)$$

For more information on implementing these and other types of digital modulation see *Digital Communications* by John G. Proakis, chapter 4, sections 3–4, and chapters 9–10, (McGraw-Hill, Inc., 1995).

In a preferred embodiment, the DSP 220 is capable of handling any number of symbols for any modulation technique, for instance 256 symbols or more. Most often, the transmitter will implement an error detection/correction scheme using only a subset of the available symbols. This technique is called channel coding and is described in detail in *Digital Communications* by John G. Proakis, chapters 7–8, (McGraw-Hill, Inc., 1995) and in *Elements of Information Theory* by Thomas Cover and Joy Thomas, chapter 8, (John Wiley & Sons, Inc., 1991).

Although the symbols may be constructed by actually generating the carrier pulses and modulating data onto the pulses, a preferred embodiment contemplates that the symbols reside in the lookup table 400 where they can be accessed and transmitted as needed. Accordingly, the symbols preferably are generated and stored in the lookup table 400 when the DSP 220 is programmed or manufactured, although the symbols may be generated during normal operation if desired, or updated at any time. Further, the lookup table 400 preferably includes a plurality of possible waveforms for each symbol. Consequently, the transmitted waveforms can be chosen according to changing conditions of the communications channel (i.e., the POTS line), in order to minimize the deleterious effects of intersymbol interference (ISI) and noise.

In addition to creating modulated waveforms, the DSP 220 also demodulates and detects data embedded into the incoming digital signal. In a preferred embodiment, the DSP 220 correlates the incoming signal with local copies of the transmitted pulse. Correlation involves multiplying the received waveform by a local pulse, sample by sample, and accumulating the multiplication products over a symbol period. Depending on the type of modulation technique that was originally used to create the incoming signal, the correlation process may involve correlating the received signal with two symbol waveforms that are offset 90° relative to each other (or "in quadrature"). The resulting accumulated sum(s) are then matched to a digital data symbol corresponding to the sum(s), which becomes the digital data transmitted to the computer system 100 via the MAC 224. Other demodulation/detection schemes may be used as well, without departing from the principles of this disclosure.

For example, to demodulate a QPSK signal embedded in a sinusoidal carrier, the DSP 220 correlates the incoming signal with two local carriers: a cosine signal and a sine signal. The phase of the incoming signal can be determined by dividing the cosine correlation by the sine correlation and calculating the inverse tangent of the resulting quotient. The accuracy of the phase result depends on the accuracy of the carrier recovery timing. Use of the DPLL 300 for carrier recovery, however, should provide sufficient accuracy. The phase of a QAM signal can be determined in a similar manner. The amplitude of a QAM signal can be measured by summing the squares of the cosine and sine correlations and calculating the square root of the resulting sum.

If desired, the DSP 220 can demodulate the data using a filter that is matched to the expected incoming carrier. A digital matched filter generally comprises a sampled and time-reversed copy of the carrier. The DSP 220 samples the matched filter output periodically during each symbol period to detect the data (the symbol period corresponds to the number of samples processed during a symbol period). If the incoming signal is modulated using a quadrature phase-based scheme such as QAM or QPSK, then either the filter output may be sampled twice within each period, or two matched filters may be implemented.

Figure 5:
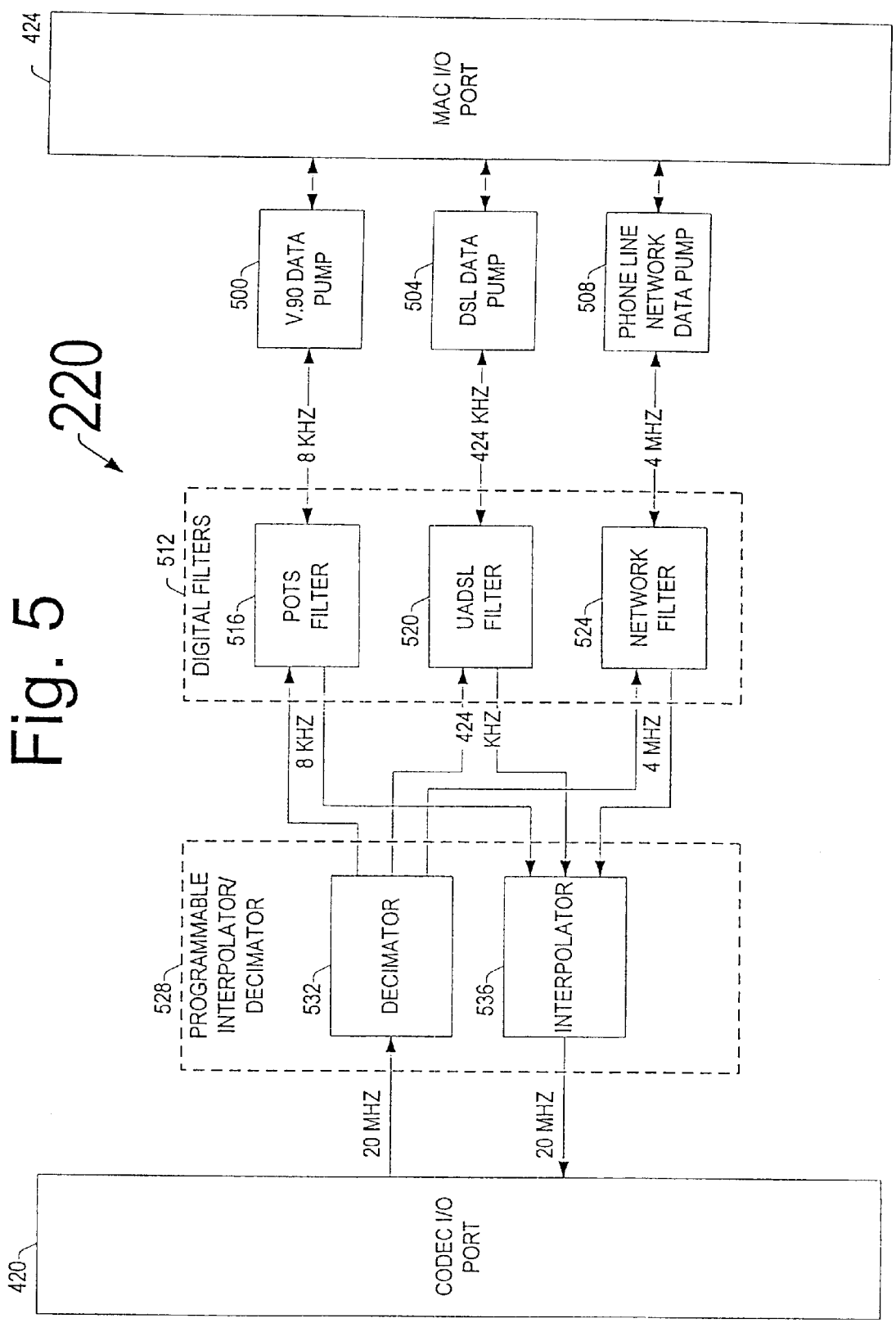
FIG. 5 illustrates an alternative processing architecture for the DSP of FIG. 2.

FIG. 5 illustrates an alternative embodiment of DSP 220 that is configured to provide a variety of communications schemes in a single apparatus. As shown, the networking modem includes a V.90 data pump 500 for generating and decoding standard telephone modem data signals, faxes, audio/voice signals, and the like. The modem 130 further includes a DSL data pump 504 for generating and decoding DSL modem signals and a network data pump 508 for generating and decoding phone line network signals. If desired, the networking modem 130 may include data pumps for other technologies, such as Integrated Services Digital Network (ISDN).

The data pumps 500, 504, and 508 couple to a bank of digital filters 512, including a POTS filter 516 connected to the V.90 data pump 500, a UASDL filter 520 connected to the DSL data pump 504, and a POTS filter 524 connected to the phone line network data pump 508. The three filters 516, 520, and 524 further couple to a programmable interpolator/decimator 528, which comprises a decimator 532 and an interpolator 426. The decimator 532 and interpolator 536 generally condition the sample rates of the incoming and outgoing signals, respectively, to permit the data pumps 500, 504, and 508 to operate at independent sample rates. The decimator 532 receives incoming digital signals from the CODEC 216 via the CODEC I/O port 420, adjusts the incoming sample rate to match each data pump, and passes the sample-rate-adjusted signals on to the data pumps 500, 504, and 508. The interpolator 536 receives samples from each of the data pumps 500, 504, 508, adjusts the three signals to the same sample rate, and combines the resulting signal to create an outgoing digital signal. The interpolator 536 transmits the outgoing digital to the CODEC via the CODEC I/O port 420.

Although the data pumps 500, 504, and 508, filters 516, 520, and 524, interpolator 536, and decimator 532 reside within DSP 220 in the embodiment of FIG. 5, any of these units may reside outside of DSP 220 if desired. A collection of processors, for example, may be coupled together and programmed or otherwise configured to provide the functions of these units. In one alternative embodiment, the CPU 102 implements the data pumps. In another embodiment, the data pumps are implemented using an ASIC, one or more custom chip sets, or other dedicated circuitry.

The data pumps 500, 504, and 508 generally provide modulation, demodulation, and possibly filtering for the incoming and outgoing digital signals. The sample rates for data pumps 500, 504, and 508 can be adjusted as desired, according to desired performance characteristics. Preferably, however, the sample rates are set according the Nyquist criterion, which requires that the sample frequency is at least twice the bandwidth of the signal. The V.90 data pump 500 generally processes signals below 4 kHz, so the V.90 sample rate preferably is 8 kHz. The DSL data pump 504 handles signals in the range of 100 kHz to 512 kHz, a total bandwidth of 412 kHz. Accordingly, the DSL data pump 504 preferably operates at or above 824 kHz. In a preferred embodiment, the phone line network signals occupy a 4 MHz bandwidth, ranging from approximately 4 MHz to 8 MHz. The phone line network data pump 508 thus includes a minimum sample rate of 8 MHz. Note that the above frequency ranges and sample rates are merely examples which may be adjusted as desired.

The filters 516, 520, and 524 digitally process the incoming and outgoing digital signals to suppress out of band signals, thus preventing the V.90, DSL, and POTS signals from interfering with each other. Preferably the filters 516, 520, and 524 operate at the same sample rates as the corresponding data pumps 500, 504, and 508, respectively, although the filters 516, 520 and 524 may operate at any desired rates. The filters 516, 520, and 524 preferably implement "brick wall" bandpass filters, although any desired transfer functions are acceptable. In particular, the transfer characteristics may be optimized for a specific channel characteristic and may be adaptive, tunable, programmable, or otherwise variable as desired. Recommended filter bandwidths are 200 Hz to 4 kHz for the POTS filter 516, 100 kHz to 512 kHz for the UADSL filter 520, and 4 MHz to 8 MHz for the phone line network filter 524. The exact frequency ranges may be adjusted as desired, particularly in accordance with the characteristics of the particular signal processing algorithms chosen.

Because the digital samples enter DSP 220 at a higher rate than the processing rates of the data pumps and filters, decimator 532 reduces the incoming 20 MHz sample stream by retaining certain samples and discarding the remaining samples. Because the V.90 data pump 500 processes 8,000 samples per second, decimator 532 selects 8,000 of every 20 million incoming samples to feed the POTS filter 516. Similarly, decimator selects 424,000 samples per second to feed the DSL data pump 504 and 8 megasamples per second to feed the phone line network data pump 508. In a preferred embodiment, these rates are programmable, and the samples distributed to a given filter preferably are evenly spaced in time. Accordingly, the decimator 532 effectively downsamples the incoming 20 MHz data stream independently for each data pump/filter combination. As desired, the decimator 532 may implement other processing schemes to enhance resolution or filtering over a duration of samples instead of discarding samples.

The interpolator 536 generally performs the opposite function of the decimator 532. The interpolator accepts sample streams at different rates from the filters 516, 520, and 524, raises the signals to a common sampling rate, and combines the resulting signals as an outgoing digital signal transmitted to the CODEC I/O port 420. In a preferred embodiment, the common sampling rate is 20 MHz, but the rate preferably is programmable. The interpolator 536 can raise the sample rates using any of a number of interpolation techniques, although a preferred embodiment contemplates that each incoming sample is repeated at a rate of 20 MHz until the next incoming sample arrives. This interpolation scheme corresponds to a $0^{th}$ order interpolation. First order interpolation or higher order techniques may be used, as well, in which 20 MHz samples are created in between the incoming samples to create a smooth curve. If desired, the interpolator/decimator 528 may be located between the filters 512 and the data pumps 500, 504, and 508 so that incoming signals are filtered prior to decimation.

The digital processing performed by the networking modem thus provides a number of features that enable it to overcome the limitations of prior art phone networking devices that rely on analog components to perform digital processing. At the same time, the networking modem ensures compatibility with prior art PPM devices, as well as devices which implements more standard modulation techniques such as QPSK and QAM. The digital signal processor permits a wide variety of processing options, including the capability to adjust the spectral content of the transmitted signals, resulting in maximum channel capacity and data rates. Outgoing symbols can be appropriately shaped or selected to compensate for channel conditions on the telephone line, thus reducing intersymbol interference (ISI). In addition, digital filtering, correlation processing, echo cancellation, and other digital processing techniques in the DSP improve noise immunity, reduce intersymbol interference, and permit full duplex communication. The DSP also improves symbol timing recovery through the use of a digital phase locked loop, eliminating the need to synchronize the transmitter clock to the receiver clock and providing a more robust and frequency selective carrier detector than offered by prior art devices. Further, the use of a lookup table to store multiple transmitted waveforms permits highly efficient modulation processing and adaptive channel coding techniques.

Numerous variations and modifications will become apparent to those skilled in the art once the above disclosure is fully appreciated. It is intended that the following claims be interpreted to embrace all such variations and modifications.

We claim:

1. A computer system, comprising:

a central processing unit;

a memory array coupled to said central processing unit;

an expansion bus coupled to said central processing unit and said memory array, said expansion bus capable of interfacing peripheral devices; and a networking modem coupled to said expansion bus, comprising:

an expansion bus interface coupled to said expansion bus;

a network interface capable of connecting to a telephone line; and a programmable digital signal processor coupling said expansion bus interface to said network interface;

wherein said computer system is capable of using said networking modem to communicate with another device connected to the telephone line.

2. The computer system of claim 1, wherein said networking modem is capable of full duplex communication over the telephone line.

3. The computer system of claim 2, wherein said networking modem further comprises a CODEC disposed between said network interface and said digital signal processor, said CODEC comprising:
- an analog to digital converter that converts analog signals received through said network interface into incoming digital data and applies the incoming digital data to said digital signal processor; and
- a digital to analog converter that converts digital data output from said digital signal processor into outgoing analog signals and applies the outgoing analog signals to the telephone line through said network interface.

4. The computer system of claim 3, wherein said digital signal processor digitally modulates a carrier with data received from said expansion bus, and wherein the digital modulation is selected from the group consisting of pulse position modulation, pulse amplitude modulation, quadrature amplitude modulation, phase shift keying, and quadrature phase shift keying.

5. The computer system of claim 3, wherein said digital signal processor demodulates a digital data signal received from the telephone line, and wherein the digital modulation comprises at least one of the following: pulse position modulation, pulse amplitude modulation, quadrature amplitude modulation, phase shift keying, and quadrature phase shift keying.

6. A computer system, comprising:
- a central processing unit;
- an input device operatively coupled to said central processing unit;
- a memory device coupled to said central processing unit; and
- a phone line networking modem coupled to said central processing unit and said memory device, comprising:
  - a computer interface coupled to said central processing unit and said memory device and that transmits receives data within said computer system;
  - a phone line interface connectable to a telephone line and capable of transmitting and receiving data simultaneously over the telephone line; and
  - a digital signal processor coupling said computer interface to said phone line interface;
- wherein said phone line modem is capable of full duplex communication with another device connected to said telephone line.

7. The computer system of claim 6, wherein said digital signal processor is programmable.

8. The computer system of claim 6, wherein said phone line modem further comprises a CODEC disposed between said phone line interface and said digital signal processor, said CODEC comprising:
- an analog to digital converter that converts analog signals received through said phone line interface into incoming digital data and applies the incoming digital data to said digital signal processor; and
- a digital to analog converter that converts digital data output from said digital signal processor into outgoing analog signals and applies the outgoing analog signals to the telephone line through said phone line interface.

9. The computer system of claim 8, wherein said digital signal processor transmits data over the telephone line using digital modulation, and wherein the digital modulation comprises at least one of the following: pulse position modulation, pulse amplitude modulation, quadrature amplitude modulation, phase shift keying, and quadrature phase shift keying.

10. The computer system of claim 8, wherein said digital signal processor receives and demodulates a digital data signal received from the telephone line, and wherein the digital modulation is selected from the group consisting of pulse position modulation, pulse amplitude modulation, quadrature amplitude modulation, phase shift keying, and quadrature phase shift keying.

11. A networking modem, comprising:
- a bus interface to a bus within a computer;
- a programmable digital signal processor coupled to the bus interface;
- a digital to analog converter coupled to said digital signal processor; and
- telephone line coupling magnetics adapted to permit said networking modem to communicate with other devices over a telephone line;
- wherein if a telephone line is coupled to said coupling magnetics, said digital signal processor is configured to transmit digital data signals to another networking device coupled to the same telephone line using one of the following modulation techniques: pulse position modulation, pulse amplitude modulation, quadrature amplitude modulation, phase shift keying, and quadrature phase shift keying.

12. The networking modem of claim 11, wherein the bus interface is configured to receive digital data, wherein the digital data signals represent the digital data received through said bus interface.

13. The networking modem of claim 12, wherein said networking modem comprises an internal computer modem and wherein said bus interface is configured to mate with an expansion bus card slot within a computer system.

14. A networking modem, comprising:
- a bus interface that permits the modem to communicate with a computer;
- telephone line coupling magnetics;
- an analog to digital converter coupled to said telephone line coupling magnetics and that samples an analog signal received from said coupling magnetics; and
- a programmable digital signal processor that couples to the bus interface and the analog to digital converter and that receives the sampled signal from said analog to digital converter and demodulates the sampled signal to produce digital data;
- wherein said digital signal processor is configured to communicate with another networking device over a telephone line that couples said networking device to said networking modem.

15. The networking modem of claim 14, wherein said digital signal processor is configured to use said bus interface to transfer demodulated digital data to the computer.

16. The networking modem of claim 15, wherein said networking modem comprises an internal computer modem and wherein said bus interface mates with an expansion bus card slot within a computer system.

17. The networking modem of claim 15, wherein the incoming digital data signal is modulated according to a modulation technique selected from the group consisting of pulse position modulation, pulse amplitude modulation, quadrature amplitude modulation, phase shift keying, and quadrature phase shift keying.

18. The networking modem of claim 14, wherein said programmable digital signal processor is configured to transmit an outgoing digital data signal to the other networking device.

19. The networking modem of claim 18, further comprising a digital to analog converter coupled to said digital signal processor and that converts the outgoing digital data signal into an outgoing analog signal.

20. The networking modem of claim 19, wherein said networking modem is capable of full duplex, multidrop communications over an attached telephone line.

21. The networking modem of claim 20, further comprising a bus interface attachable to a computer system, wherein the outgoing digital data signal represents digital data received from an attached computer system through said bus interface.

22. The networking modem of claim 21, wherein the outgoing digital data signal is created using a modulation technique selected from the group consisting of pulse position modulation, pulse amplitude modulation, quadrature amplitude modulation, phase shift keying, and quadrature phase shift keying.

23. A networking modem, comprising:
- a coupling means for transmitting and receiving signals over a telephone line;
- a conversion means for converting incoming analog signals received via said coupling means into incoming digital signals and for converting outgoing digital signals into outgoing analog signals which are sent to said coupling means;
- a processing means for creating and demodulating digitally modulated signals, said processing means coupled to said conversion means; and
- a means for interfacing a computer bus, said means for interfacing coupled to said processing means and for transferring data between a computer bus and said processing means;
- wherein said processing means creates digitally modulated outgoing digital signals and transmits the outgoing digital signals to the telephone line via said conversion means and said coupling means.

24. The networking modem of claim 23, wherein said modem is capable of full duplex communications over the attached telephone line.

25. The networking modem of claim 24, wherein the outgoing digital data signal is created using a modulation technique selected from the group consisting of pulse position modulation, pulse amplitude modulation, quadrature amplitude modulation, phase shift keying, and quadrature phase shift keying.

26. A method of networking computers, comprising:
- connecting a telephone line between a first computer and a second computer;
- supplying data to a first programmable digital signal processor within said first computer;
- creating within said first programmable digital signal processor a carrier signal that is digitally modulated with the data;
- transmitting the modulated carrier signal from said first computer to said second computer over said telephone line;
- sampling the transmitted modulated carrier signal within said second computer; and
- demodulating the sampled carrier signal within a second digital signal processor in said second computer.

27. The method of claim 26, including transmitting data from said first and second computers over the telephone line simultaneously.

28. The method of claim 26, wherein creating the carrier signal comprises reading a symbol waveform from a lookup table within said first digital signal processor.

29. The method of claim 28, wherein the symbol waveform is chosen from said lookup table based on the channel characteristics of the telephone line at a first time.

30. The method of claim 29, wherein the symbol waveform is chosen to compensate for the channel effect of the telephone line at the first time.

31. The method of claim 30, wherein the data value is again transmitted at a second time, and wherein a different symbol waveform is chosen at the second time based on the channel conditions at the second time.

32. The method of claim 26, wherein the carrier signal is created using a modulation technique selected from the group consisting of pulse position modulation, pulse amplitude modulation, quadrature amplitude modulation, phase shift keying, and quadrature phase shift keying.

* * * * *